(12) United States Patent  
Kajihara et al.

(10) Patent No.: US 11,008,415 B2  
(45) Date of Patent: May 18, 2021

(54) RESIN CURED PRODUCT, ELECTRICAL DEVICE, MOTOR, TRANSFORMER, CABLE SHEATH, MOBILE, STRUCTURE, AND METHOD FOR HEALING RESIN CURED PRODUCT

(71) Applicant: HITACHI, LTD., Tokyo (JP)

(72) Inventors: Yuri Kajihara, Tokyo (JP); Takahito Muraki, Tokyo (JP); Yasuhiko Tada, Tokyo (JP); Jun Nunoshige, Tokyo (JP); Takeshi Kondo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 260 days.

(21) Appl. No.: 16/322,833

(22) PCT Filed: Jul. 7, 2017

(86) PCT No.: PCT/JP2017/024903  
§ 371 (c)(1),  
(2) Date: Feb. 1, 2019

(87) PCT Pub. No.: WO2018/042880  
PCT Pub. Date: Mar. 8, 2018

(65) Prior Publication Data  
US 2019/0202959 A1  Jul. 4, 2019

(30) Foreign Application Priority Data

Aug. 29, 2016 (JP) .............................. JP2016-166401

(51) Int. Cl.  
*C08F 293/00* (2006.01)  
*H01F 27/32* (2006.01)  
(Continued)

(52) U.S. Cl.  
CPC ............ *C08F 293/005* (2013.01); *C08J 7/16* (2013.01); *H01B 3/44* (2013.01); *H01F 27/327* (2013.01);  
(Continued)

(58) Field of Classification Search  
CPC ...... C08F 293/005; C08F 2438/00; C08J 7/16  
See application file for complete search history.

(56) References Cited

U.S. PATENT DOCUMENTS

2005/0250878 A1  11/2005 Moore et al.  
2009/0000519 A1* 1/2009 Schwalm .............. C08G 18/672  
106/481  
(Continued)

FOREIGN PATENT DOCUMENTS

JP  2003-261734 A  9/2003  
JP  2007-536410 A  12/2007  
(Continued)

OTHER PUBLICATIONS

Niunoshige et al. "Restoration Function of Fractured Thermosetting Polymer via Living Radical Polymerization by Alkylborane Initiator". Network Polymer, Jul. 10, 2015, vol. 36, No. 4, pp. 192-198, ISSN 1342-0577.  
(Continued)

*Primary Examiner* — Philip C Tucker  
*Assistant Examiner* — John Blades  
(74) *Attorney, Agent, or Firm* — Volpe Koenig (57) ABSTRACT

In a conventional self-healing material, although the resin properties after self-healing are restored to the same level as the initial refractoriness and strength of the resin, no further extension of life can be expected. A resin cured product according to the present invention includes: a first vinyl  
(Continued)

monomer having an ester bond; a second vinyl monomer having a hydroxyl group; a transesterification reaction catalyst; and a boron compound.

15 Claims, 9 Drawing Sheets

(51) Int. Cl.
  *H01B 3/44* (2006.01)
  *C08J 7/16* (2006.01)
  *C08K 5/55* (2006.01)
  *C08K 5/098* (2006.01)
  *H02K 3/30* (2006.01)

(52) U.S. Cl.
  CPC ....... *C08F 2438/00* (2013.01); *C08J 2353/00* (2013.01); *C08K 5/098* (2013.01); *C08K 5/55* (2013.01); *H01B 3/442* (2013.01); *H01B 3/447* (2013.01); *H01F 27/324* (2013.01); *H02K 3/30* (2013.01)

(56) References Cited

U.S. PATENT DOCUMENTS

| | | | |
|---|---|---|---|
| 2009/0098299 A1* | 4/2009 | Cheng | C08J 7/16 427/384 |
| 2010/0156587 A1 | 6/2010 | Muraki et al. | |
| 2014/0024765 A1 | 1/2014 | Nunoshige et al. | |
| 2016/0319056 A1 | 11/2016 | Kajihara et al. | |

FOREIGN PATENT DOCUMENTS

| | | |
|---|---|---|
| JP | 2010-144109 A | 7/2010 |
| JP | 2012-241076 A | 12/2012 |
| JP | 2014-136706 A | 7/2014 |
| JP | 2015-214661 A | 12/2015 |
| WO | 2012/137338 A1 | 10/2012 |
| WO | 2015/097835 A1 | 7/2015 |
| WO | 2016/178345 A1 | 11/2016 |

OTHER PUBLICATIONS

International Search Report dated Aug. 15, 2017 for the International Application No. PCT/JP2017/024903.

* cited by examiner

RESIN CURED PRODUCT, ELECTRICAL DEVICE, MOTOR, TRANSFORMER, CABLE SHEATH, MOBILE, STRUCTURE, AND METHOD FOR HEALING RESIN CURED PRODUCT

TECHNICAL FIELD

The present invention relates to a resin composition, a healing method and life extension therefor, and a product using a resin cured product.

BACKGROUND ART

Materials used for products, parts, and the like are selected according to the required function, strength, usage environment, and the like considering the properties of each material. However, due to the loads from the long-term environment and the like and also as a result of continuous use, the material is externally damaged, deformed, degraded, or embrittled, for example, and thus fractured. The period of time until fracture varies depending on the usage environment, the kind of material, and the like, but there exists a "material life". In order to ensure the safety of the product or part, a material having a long material life, that is, high weather resistance, is desirable. For the purpose of extending the material life, resins having higher strength and higher refractoriness have been developed in the past.

For example, a thermoplastic elastomer rich in flexibility and also excellent in mechanical strength, oil resistance, and refractoriness has been developed (PTL 1). This elastomer uses a transesterification reaction. In recent years, a technology for imparting self-healing properties to a resin material has been developed. Techniques for imparting self-healing properties are mainly divided into physical healing methods and chemical healing methods. A physical healing method is a method that uses the molecular diffusion of a thermoplastic resin, and the present invention focuses on chemical techniques. For example, as chemical techniques, a self-healing material having a capsule containing a healing material (PTL 2) and a self-healing material using a living radical polymerization method (PTL 3) are known.

CITATION LIST

Patent Literature

PTL 1: JP 2003-261734 A
PTL 2: JP 2007-536410 A
PTL 3: WO 2012/137338

SUMMARY OF INVENTION

Technical Problem

However, in self-healing materials, with the technologies of the above patent literatures, although the resin properties after self-healing are restored to the level of the initial refractoriness and strength of the resin, no further extension of life can be expected.

Solution to Problem

A resin cured product according to the present invention includes: a first vinyl monomer having an ester bond; a second vinyl monomer having a hydroxyl group; a transesterification reaction catalyst; and a boron compound.

Advantageous Effects of Invention

According to the present invention, the refractory life can be dramatically extended over conventional self-healing materials.

DESCRIPTION OF EMBODIMENTS

The resin cured product of this embodiment contains a first vinyl monomer having an ester bond, a second vinyl monomer having a hydroxyl group, a transesterification reaction catalyst, and a boron compound. Here, a hydroxyl group refers to an —OH group and is used to mean that a hydroxyl group is contained.

The resin cured product of this embodiment is produced by heating and curing a liquid varnish containing a compound having an ester bond, a hydroxyl group, and two or more vinyl bonds, a living radical polymerization initiation catalyst, a transesterification reaction catalyst, and a boron compound. The liquid varnish of this embodiment contains a vinyl monomer having a hydroxyl group, an ester bond group, and two or more vinyl groups (vinyl bonds). Specific examples of vinyl monomers usable in this embodiment include 2-hydroxy methacrylate, hydroxypropyl methacrylate, 4-hydroxybutyl acrylate, divinylethylene glycol, monomethyl fumarate, hydroxypropyl acrylate, ethyl 2-(hydroxymethyl)acrylate, glycerol dimethacrylate, allyl acrylate, methyl crotonate, methyl methacrylate, methyl 3,3-dimethacrylate, diethylene glycol dimethacrylate, ethylene glycol dimethacrylate, triethylene glycol dimethacrylate, dimethyl fumarate, fumaric acid, 1,4-butanediol dimethacrylate, 1,6-hexanediol dimethacrylate, 1,3-butanediol dimethacrylate, tetraethylene glycol dimethacrylate, tetraethylene glycol diacrylate, vinyl crotonate, crotonic anhydride, diallyl maleate, neopentyl glycol diacrylate, neopentyl glycol dimethacrylate, trimethylolpropane triacrylate, and trimethylolpropane trimethacrylate. However, other compounds besides them are also applicable.

As a monomer contained in the liquid varnish of this embodiment, a monomer having one vinyl bond may be contained. Specific examples thereof include aromatic vinyl compounds, aromatic allyl compounds, heterocycle-containing vinyl compounds, heterocycle-containing allyl compounds, mono-(meth)acrylates of alkylene glycols, alkoxyalkyl (meth)acrylates, cyanoalkyl (meth)acrylates, acrylonitrile, methacrylonitrile, hydroxyalkyl esters of unsaturated carboxylic acids, unsaturated alcohols, unsaturated (mono)carboxylic acids, unsaturated polycarboxylic acids, unsaturated polycarboxylic anhydrides, dicyclopentadienyl, and ethylidene norbornene. Such a monomer is combined with a vinyl monomer having a hydroxyl group and/or an ester bond group and having two or more vinyl bonds, and subjected to a copolymerization reaction, whereby the amount of the transesterification reaction region can be controlled. As a result, it becomes possible to control the crosslinking density or control the flexibility of the main-chain skeleton. By controlling the crosslinking density or the flexibility of the main-chain skeleton, the elastic modulus can also be changed. Accordingly, it is also possible to control the thermal deformation properties.

The liquid varnish of this embodiment is characterized by containing a living radical polymerization initiation catalyst and a transesterification reaction catalyst.

Examples of living polymerization initiation catalysts applicable to the liquid varnish of this embodiment include, but are not limited to, transition metal compounds, thiocarbonyl compounds, and alkylborane compounds. However, in this embodiment, boron compounds are preferable, and alkylboranes are particularly preferable. A boron compound is characterized in that oxygen contributes to the initiation of a reaction, and, also in a resin cured product, the living radical polymerizability of the radically polymerizable ends is not deactivated for a long period of time.

Examples of boron compounds applicable to this embodiment include, but are not limited to, diethylmethoxyborane, trimethoxyborane, tri-n-butoxydiborane, catecholborane, triethylborane, triphenylborane, tri-n-butylborane, tri-sec-butylborane, tri-tert-butylborane, siamylborane, and bicyclo[3,3,1]nona-9-borane (9-BBN).

Among them, diethylmethoxyborane, triethylborane, and 9-BBN are preferable. In addition, one kind of radical polymerization initiation catalyst may be used alone, and it is also possible that two or more kinds are used in an arbitrary ratio and combination.

The resin cured product of this embodiment can be obtained by curing by living radical polymerization using the above boron compound as a living radical polymerization initiation catalyst. With respect to the living radical polymerization reaction, polymerization can be carried out by a known arbitrary method.

As compared with resins cured by a usual radical polymerization method, the resin cured product of this embodiment cured using a living radical polymerization method has a higher thermal decomposition temperature and thus has higher refractoriness.

In a living radical polymerization method, as compared with a usual radical polymerization method, the formation of unsaturated bonds susceptible to thermal decomposition (disproportionation reaction) is suppressed. Therefore, with respect to a resin cured product having introduced therein a dynamic covalent bond by a transesterification reaction, as compared with the case where polymerization is carried out using a usual radical polymerization initiation catalyst, a resin cured product having higher refractoriness is obtained in the case of using a living radical polymerization initiation catalyst.

However, in the case where the amount of the living radical polymerization initiation catalyst is extremely small, it may happen that an excellent self-healing function cannot be imparted to the obtained resin cured product. The amount of the living radical polymerization initiation catalyst added is preferably 1 wt % or more relative to the vinyl monomer of the liquid varnish.

With respect to transesterification reaction catalysts applicable to the liquid varnish of this embodiment, it is important that the catalyst activation temperature thereof is higher than that of the living radical polymerization initiation catalyst described above. That is, in the vinyl monomer polymerization reaction, it is important that the living radical polymerization initiation catalyst serves as a reaction catalyst, and the transesterification reaction catalyst remains unreacted in the resin composition.

Applicable specific examples include zinc(II) acetate, zinc(II) acetylacetonate, zinc(II) naphthenate, iron(III) acetylacetone, cobalt(II) acetylacetone, aluminum isopropoxide, titanium isopropoxide, a methoxide(triphenylphosphine) copper(I) complex, an ethoxide(triphenylphosphine) copper(I) complex, a propoxide(triphenylphosphine) copper(I) complex, an isopropoxide(triphenylphosphine) copper(I) complex, a methoxide bis(triphenylphosphine) copper(II) complex, an ethoxide bis(triphenylphosphine) copper(II) complex, a propoxide bis(triphenylphosphine) copper(II) complex, an isopropoxide bis(triphenylphosphine) copper(II) complex, a tris(2,4-pentanedionate) cobalt(III), tin(II) diacetate, tin(II) di(2-ethylhexanoate), N,N-dimethyl-4-aminopyridine, diazabicycloundecene, diazabicyclononene, triazabicyclodecene, and triphenyl phosphine.

The liquid varnish of this embodiment may be combined with an inorganic filler. Examples of inorganic fillers applicable to this embodiment include powders of fused silica, crystal silica, alumina, zircon, calcium silicate, calcium carbonate, potassium titanate, silicon carbide, aluminum nitride, boron nitride, beryllia, zircon, forsterite, steatite, spinel, mullite, and titania, as well as beads obtained by conglobating them, glass fibers, and the like. In addition, the shape of the inorganic filler is not limited and may be spherical, scaly, or the like.

The resin cured product of this embodiment is characterized by containing a radically polymerizable end having an ester group, a hydroxyl group, a transesterification catalyst, and a boron compound.

Figure 1:
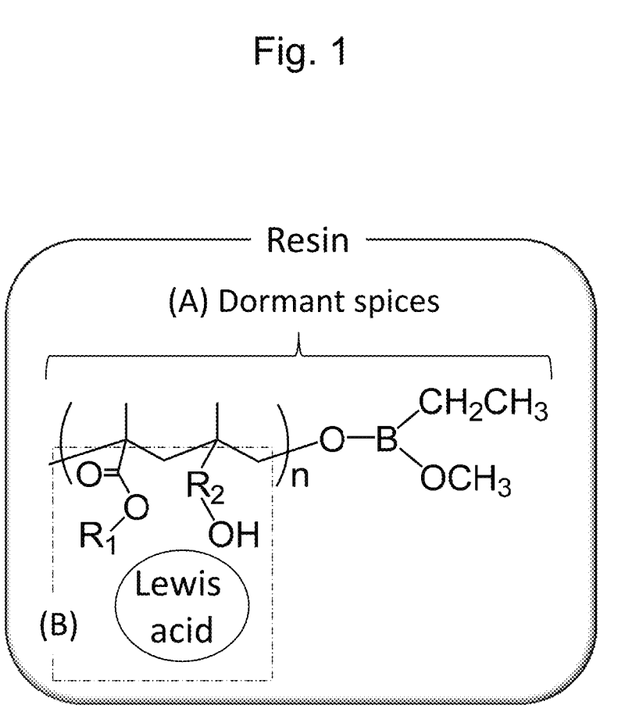
FIG. 1 is a schematic diagram of the molecular structure of the resin cured product of the present invention.

FIG. 1 is a schematic diagrams of the molecular structure of the resin cured product of this embodiment when diethylmethoxyborane is used as a living radical polymerization initiation catalyst. In a resin cured product obtained by curing the above liquid varnish, a boron compound that has functioned as a living radical polymerization initiation catalyst is present as a dormant species like (A) in FIG. 1. This dormant species is characterized by repeating dissociation-association with the polymerizable terminal bond by heat, thereby repeating the activation-deactivation of the radical species. In addition, in the resin cured product, like (B) in FIG. 1, an ester group and a hydroxyl group from a vinyl monomer and a transesterification reaction catalyst are present.

The resin cured product of this embodiment is characterized in that at the time of fracture, a region capable of initiating radical polymerization is present on a fracture surface, and radical polymerization is initiated upon contact between the fracture surface and the vinyl monomer, exerting a healing function.

Figure 2:
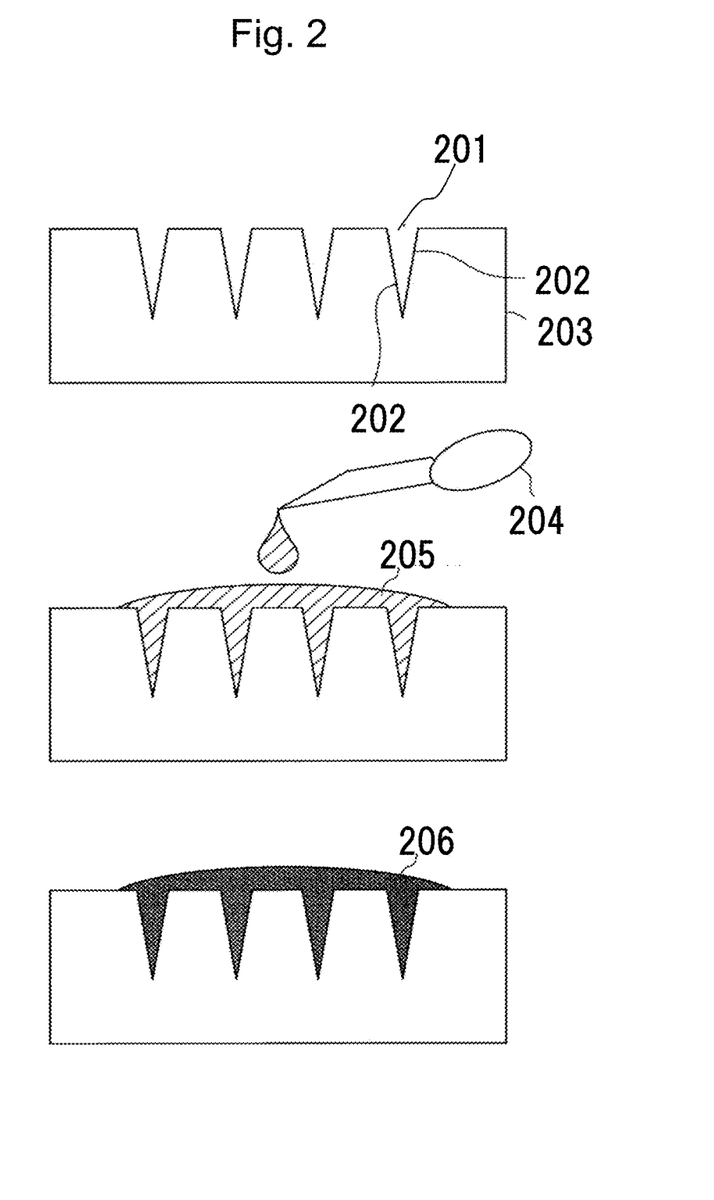
FIG. 2 is a schematic diagram showing the healing of fracture surfaces resulting from cracking in the resin cured product of the present invention.

FIG. 2 is a schematic diagram showing the healing of fracture surfaces resulting from cracking in the resin cured product of this embodiment. Based on FIG. 2, the healing function (technique) of the resin cured product will be described.

In such a manner to fill the fracture surfaces 202 of a crack 201 formed in the resin cured product 203, in atmospheric air, a healing material varnish 205 consisted only of a vinyl monomer is poured using a syringe 204, followed by heating. As a result of heating, by bonding/dissociation of the dormant species, an active radical species is generated, and the vinyl monomer is re-polymerized and cured to heal the fracture surfaces 202. As a result, a healing material cured film 206 was formed in such a manner to seal the crack 201. The healing material varnish 205 does not contain a radical polymerization initiation catalyst. In addition, the healing material varnish 205 is not particularly limited as long as it is a vinyl monomer. The vinyl monomer does not have to be the same kind as the fractured base material resin, and it is also possible to use a combination of two or more kinds.

The resin cured product of this embodiment is characterized in that in response to an external stimulus, the transesterification reaction catalyst, the ester group, and the hydroxyl group act to cause a transesterification reaction. This characteristic of the resin cured product of this embodiment is attributable to the following: the transesterification reaction catalyst that remains unreacted in the resin cured product cured by the living radical polymerization reaction of the vinyl monomer becomes catalytically active in response to a thermal stimulus. In the thermosetting resin of this embodiment, when a conventional transesterification reaction catalyst becomes catalytically active in response to a thermal stimulus, a transesterification reaction takes place between a hydroxyl/hydroxy group and an ester bond group.

Here, a thermal stimulus has been described as an example of an external stimulus, but other external stimuli besides thermal stimuli may be used as long as a transesterification reaction takes place.

Figure 3:
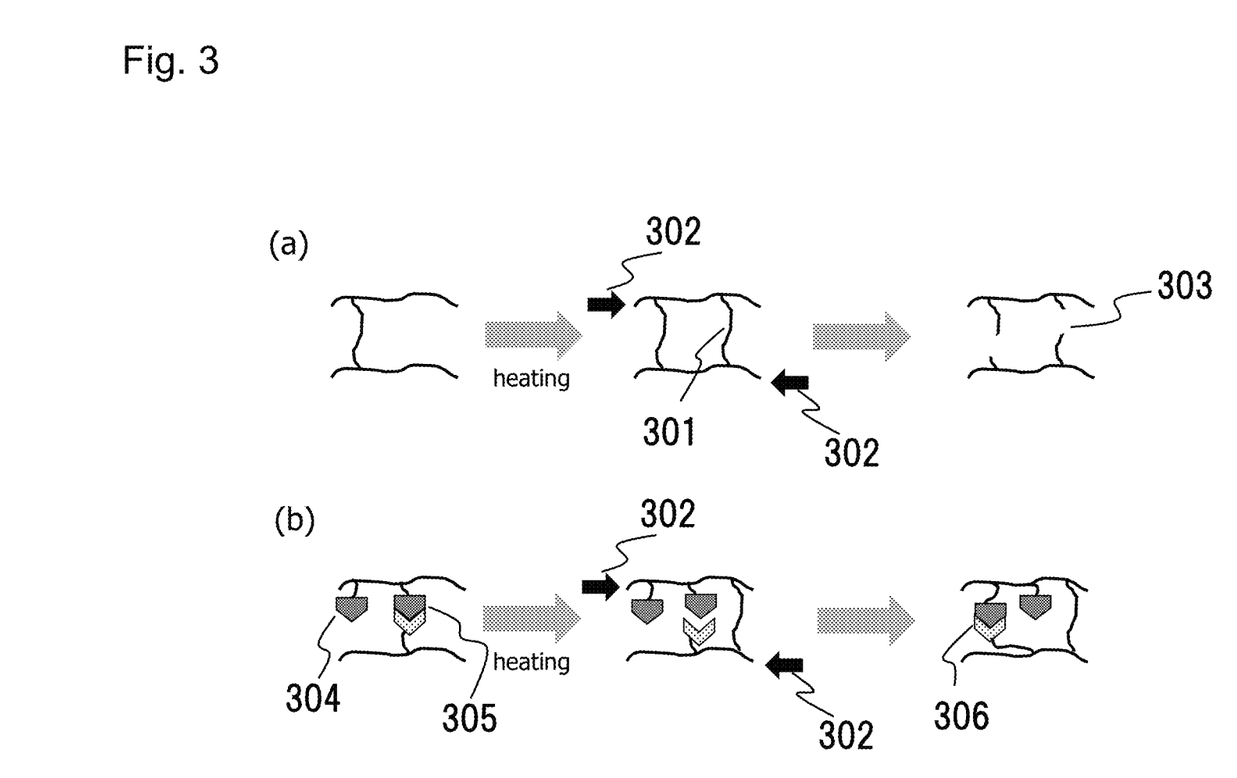
FIG. 3 is a schematic diagram of the thermal degradation mechanism of a resin cured product and the stress relief mechanism of a transesterification reaction.

FIG. 3 is a schematic diagram of the thermal degradation mechanism of a resin cured product and the stress relief mechanism of a transesterification reaction. As a main thermal degradation mechanism of a conventional radical resin cured product, a mechanism in which a crosslinking reaction proceeds, causing embrittlement, or a mechanism in which the molecular weight is reduced by depolymerization, causing embrittlement of the resin, can be mentioned. The resin cured product of this embodiment is particularly effective in the former, that is, the mechanism in which a crosslinking reaction proceeds, causing embrittlement. The mechanism of the dramatic extension of the refractory life of the resin cured product of this embodiment will be described with reference to FIG. 3. In a conventional resin, as shown in FIG. 3(a), when a crosslink 301 is formed by thermal degradation, and a stress load 302 is applied to the resin, the resin becomes brittle, resulting in a resin crack 303.

Meanwhile, as in FIG. 3(b), when a thermal stimulus is given to a resin cured product having a hydroxyl group 304 and an ester bond 305, a transesterification reaction is initiated, forming an ester bond after bond recombination. That is, in the resin cured product of this embodiment, a crosslink is formed by thermal degradation, and, even when a stress load 302 is applied, the stress is relieved by a transesterification reaction, whereby the formation of resin cracks can be prevented. With this stress relief function, the refractory life can be extended over conventional self-healing resins.

The resin cured product of this embodiment is characterized in that at the time of fracture, the fracture surfaces facing each other are closely attached to each other, then an external stimulus is applied, and at the fracture interface, in response to the external stimulus, the transesterification reaction catalyst, the ester group, and the hydroxyl group in the resin cured product act to cause a transesterification reaction, thereby exerting a healing function.

Figure 4:
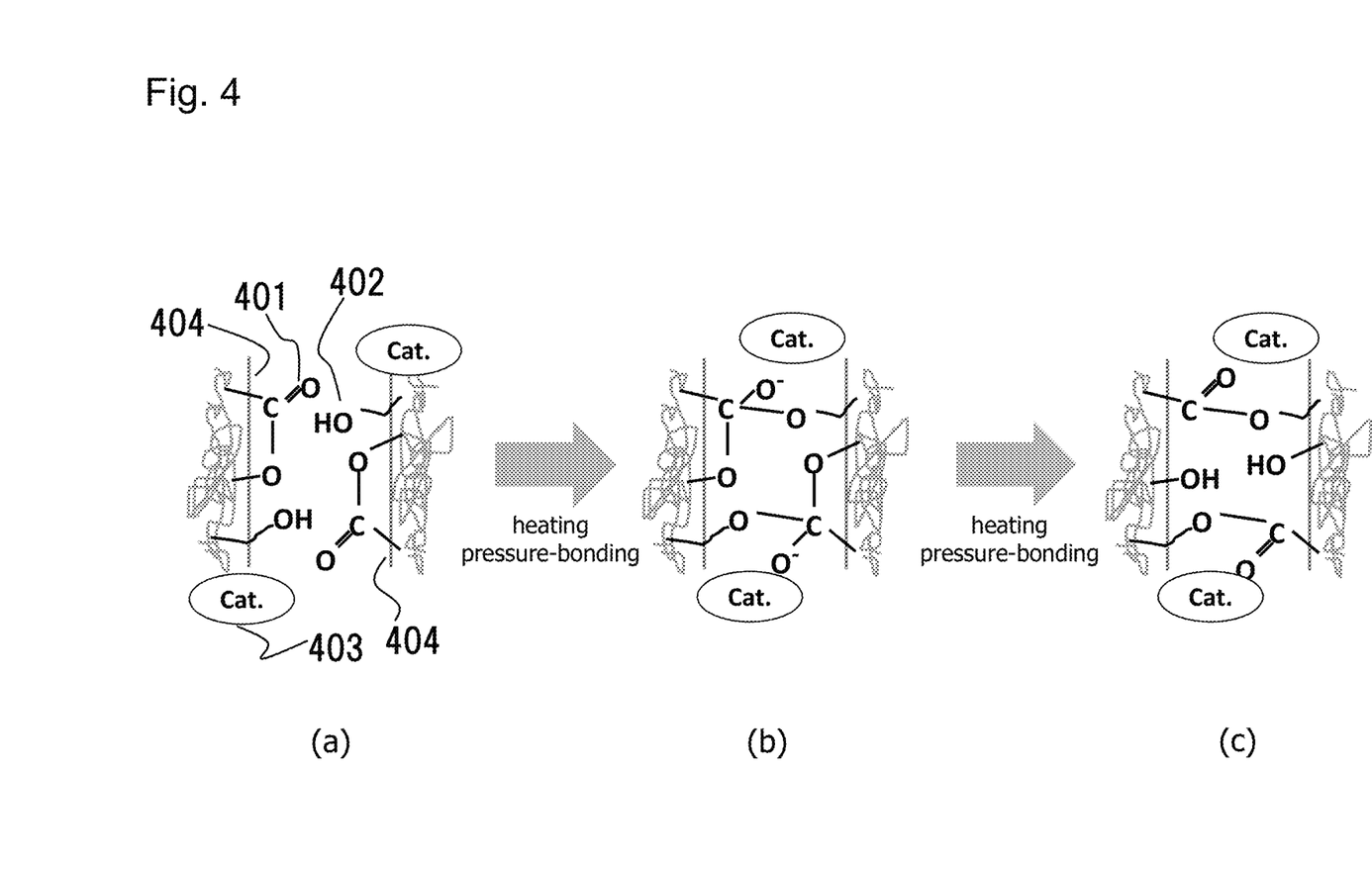
FIG. 4 is a schematic diagram of the healing function of a transesterification reaction on fracture surfaces of a resin cured product.

FIG. 4 is a schematic diagram of the healing function of a transesterification reaction on fracture surfaces of a resin cured product. The healing function (technique) will be described based on FIG. 4. The fracture surfaces facing each other are pressure-bonded, heated, thus fused (adhesion), and healed. In FIG. 4(a), on the resin fracture surfaces 404, an ester bond 401, a hydroxyl group 402, and a transesterification reaction catalyst 403 are present. This characteristic of the resin cured product of this embodiment is attributable to the following: the transesterification reaction catalyst that remains unreacted in the resin cured product cured by the living radical polymerization reaction of the vinyl monomer becomes catalytically active in response to a thermal stimulus (FIG. 4(b)). In the thermosetting resin of this embodiment, when a conventional transesterification reaction catalyst becomes catalytically active in response to a thermal stimulus, a transesterification reaction takes place between a hydroxyl/hydroxy group and an ester bond group (FIG. 4(c)). This transesterification reaction also takes place at an interface of the resin cured product of this embodiment.

When a transesterification reaction at the resin cured product interface is used, it becomes possible to perform healing in a dry process. For example, in the case where the resin cured product of the present invention is applied to a coating agent for a flooring as a building construction material, a small scratch can be healed by a simple heating step, such as ironing. A living radical polymerization method that requires a liquid as a healing material cannot be applied to such a healing method. However, the healing rate (strength after healing relative to the initial strength as 100%) is inferior to a living radical polymerization method.

<Motor Coil>

The resin cured product of this embodiment can be used as a protective layer or a varnish material for a motor coil. A motor coil has the problem of cracking due to electromagnetic vibration or the like. In the case where microcracking has occurred, by supplying a healing material from outside and inside and performing an appropriate heating treatment (use of a living radical polymerization method), the resin strength of the damaged part is restored to the same level as the initial strength. In addition, in the resin cured product of this embodiment, depending on the motor usage situation, it is also possible to prevent microcracking from occurring. In this case, because of the heat generated at the time of motor usage, bond recombination is caused by a transesterification reaction, whereby the strain (i.e., stress) which causes cracking is relieved, making it possible to prevent microcracking from occurring. The principle is the same as in FIG. 3. Further, as a result of the use of a transesterification reaction, which is a characteristic of the resin cured product of this embodiment, the thermal degradation resistant life in a long-term use is extended.

Figure 5:
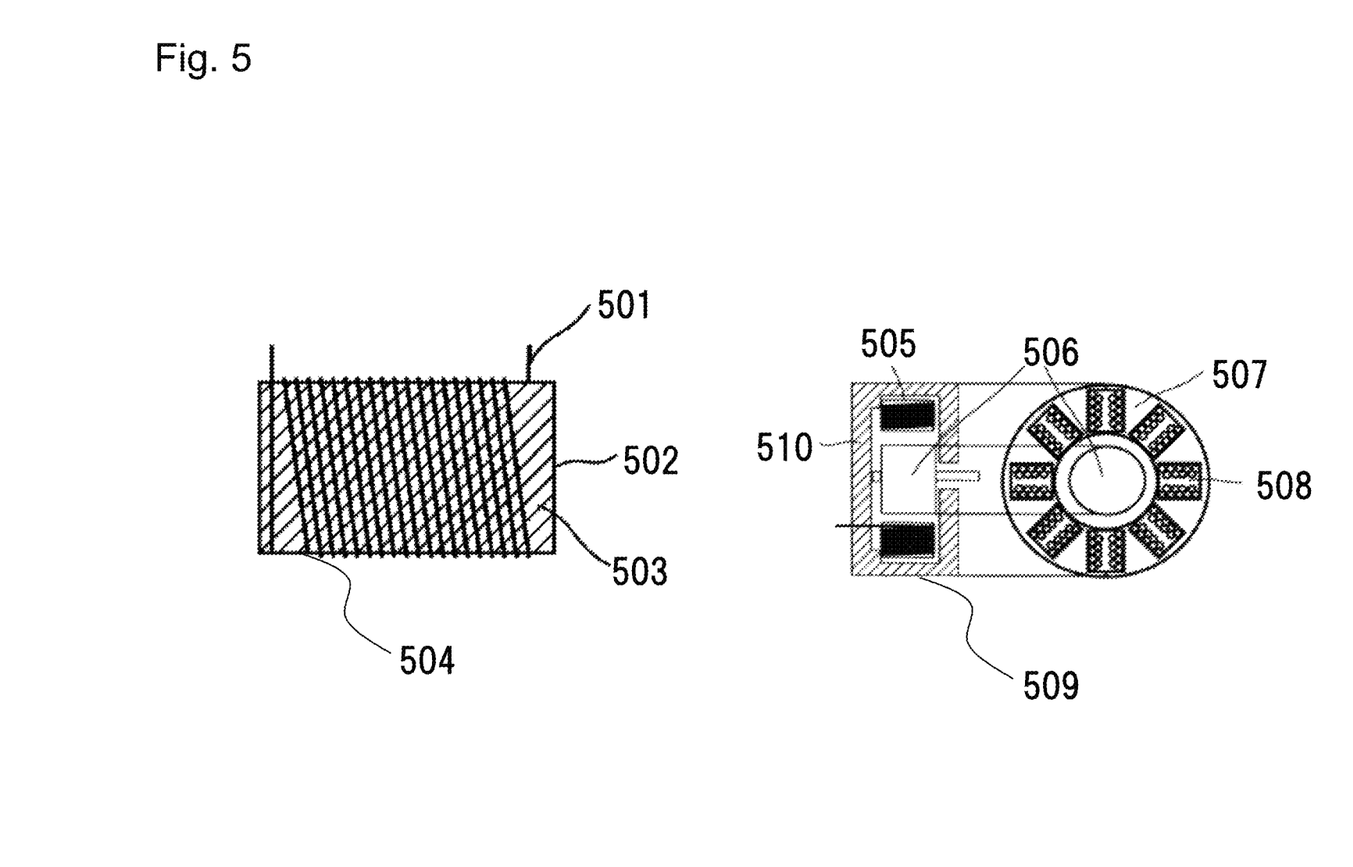
FIG. 5 is a diagram of a motor using a resin cured product as a protective layer for a motor coil.

FIG. 5 is a diagram of a motor using the resin cured product of this embodiment as a protective layer for a motor coil. The coil 504 includes a coated wire 501, a magnetic core 502, and a resin complex 503. On the magnetic core 502, the resin complex 503 is uniformly applied as a varnish for a coil protection material. The coated wire 501 and the magnetic core 502 are adhesively attached by the resin complex 503.

The coil 504 is used as a stator coil 505 in a dynamo-electric machine (motor) 509. The dynamo-electric machine 509 includes a rotor magnetic core 506, a stator magnetic core 507, a slot 508, and a housing 510.

<Molded Transformer>

Figure 6:
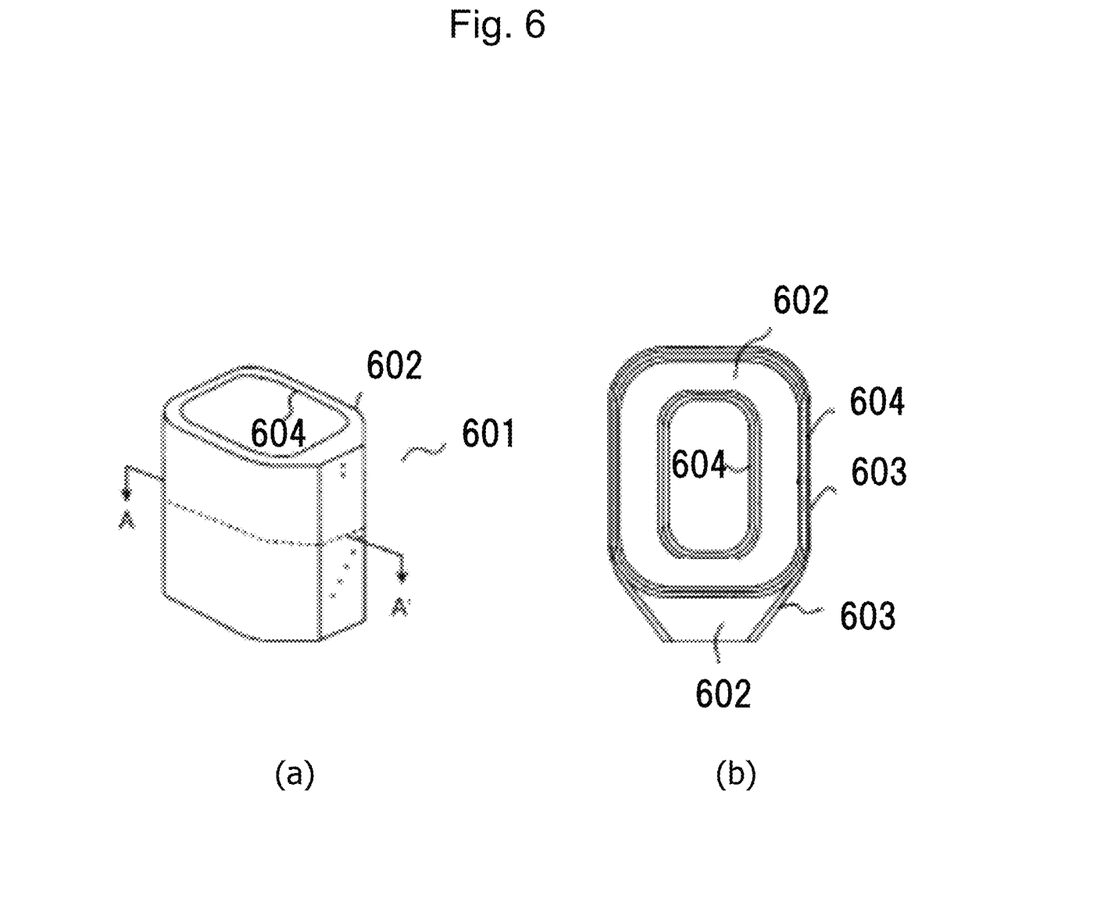
FIG. 6 is a diagram of a molded transformer using a resin cured product.

The resin cured product of this embodiment can be used as a molded resin material for a transformer. In a molded resin material for a transformer, cracking occurs due to the strain caused by the difference in expansion coefficient from other members at the time of molding. Thus, in a conventional resin, in order to improve the crack resistance, the crosslinking density of the resin is reduced, resulting in a decrease in refractoriness. In the resin according to this embodiment, the strain is relieved by bond recombination caused by a transesterification reaction, whereby cracking can be prevented. Moreover, in a conventional resin, in order to improve the crack resistance, there is a technique in which rubber particles, a filler, and the like are added to achieve high toughness. However, the addition of additives increases the resin viscosity, and voids are likely to be formed at the time of mold-shaping. As a result, microcracking occurs therefrom, leading to the problem of a decrease in electrical insulation. In the resin cured product of this embodiment, in the case where microcracking has occurred, by supplying a healing material from outside/inside and performing an appropriate heating treatment (use of a living radical polymerization method), the damaged part can be healed. FIG. 6 is a block diagram of a molded transformer using the resin cured product of this embodiment. FIG. 6(a) shows the appearance, and FIG. 6(b) shows a cross-section right-angled to the coil axis direction (A-A' cross-section). In FIG. 6, on the outermost part of a resin-molded coil 601, the surface of an exterior material 603, which is composed of a full-cure glass cloth that has been previously heat-pressed and surface-conditioned, a film-shaped insulating member 604, and a rubber sheet or a sheet of an electrically conductive member, is exposed. A resin cured product 602 is injected between the coil form and the exterior material 603. Therefore, the resin cured product 602 does not leak from or adhere to the outer surface of the exterior material 603. For this reason, even after the curing of the resin, there is no need to modify the appearance of the outer surface of the exterior material 603.

<Cable>

The resin cured product of this embodiment can be used as a sheathing layer or an insulating layer for a cable. In the sheath of a cable such as an electric wire, as a result of long-term use in a heating environment, a crosslinking reaction proceeds, whereby the sheath becomes brittle and prone to cracking. Cracking decreases the electrical insulation. These cables are not easy to replace, and thus there is a need for a material capable of local healing. In the case where the resin cured product of the present invention is used for a cable, because stress is relieved by a transesterification reaction, such cracking can be prevented from occurring. In addition, in the case where cracking has occurred, by supplying a healing material from outside and performing an appropriate heating treatment (use of a living radical polymerization method), the cracks can be healed.

Figure 7:
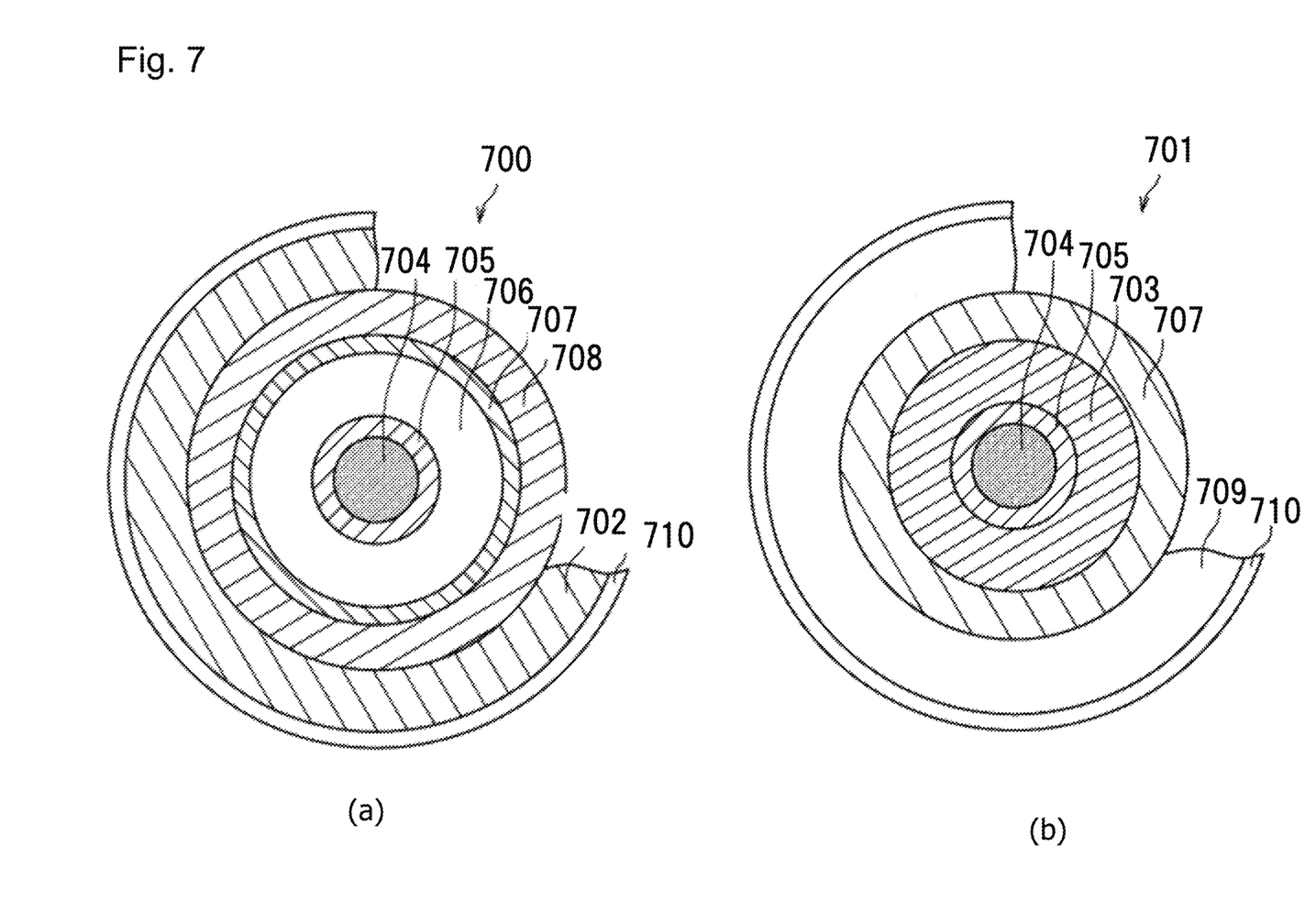
FIG. 7 is a cross-sectional view of a cable produced using a resin cured product as a sheathing layer.

FIG. 7 is a cross-sectional view of a cable produced using the resin cured product of the present invention as a sheathing layer. In the cable 700 shown in FIG. 7(a), the resin cured product of the present invention is used in a sheathing layer 702. In addition, in the cable 701 shown in FIG. 7(b), the resin cured product of this embodiment is used in an insulating layer 703.

The cable 700 shown in FIG. 7(a) includes a conductor 704, an inner semiconductor layer 705, an insulating layer 706, an outer semiconductor layer (close-attachment layer) 707, an outer semiconductor layer (detachment layer) 708, a sheathing layer 702, and an outer skin layer 710. The cable 701 shown in FIG. 7(b) includes a conductor 704, an inner semiconductor layer 705, an insulating layer 703, an outer semiconductor layer (close-attachment layer) 707, a sheathing layer 709, and an outer skin layer 710.

Materials for forming the conductor 704 are not particularly limited. For example, arbitrary good conductors, such as copper and aluminum, can be used. In addition, the form of the conductor 704 is not particularly limited either and may be a known arbitrary form, such as a solid (full) wire or a stranded wire. In addition, the cross-sectional shape of the conductor 704 is not particularly limited either and may be a circular shape, a divided-circular shape, a compressed shape, or the like, for example.

Materials for forming the inner semiconductor layer 705 and the form thereof are not particularly limited, and known arbitrary materials may be used.

Materials for forming the insulating layer 706 and the form thereof are not particularly limited. For example, oil-impregnated paper, oil-impregnated semi-synthetic paper, and like materials, rubber materials, and resin materials can be used. Examples of insulating materials such as rubber materials and resin materials include ethylene-propylene rubber, butyl rubber, polypropylene, thermoplastic elastomers, polyethylene, and crosslinked unsaturated polyethylene. Among these, polyethylene and crosslinked polyethylene are preferable since they have been widely used in insulated cables.

The outer semiconductor layer (close-attachment layer) 707 is provided for the purpose of relieving the strong electric field that is generated around the conductor 704. Examples of materials used for the outer semiconductor layer (close-attachment layer) 707 include semiconductive resin compositions containing electrically conductive carbon black blended with a resin material such as a styrene-butadiene thermoplastic elastomer, a polyester elastomer, or a soft polyolefin, and electrically conductive coating materials containing electrically conductive carbon black. However, as long as the required performance is satisfied, materials are not particularly limited. The method for forming the outer semiconductor layer (close-attachment layer) 707 on the surface of the insulating layer 706 is not particularly limited, and continuous extrusion, dipping, spray coating, application, and the like are possible according to the kind of member.

The outer semiconductor layer (close-attachment layer) 708 is, similarly to the outer semiconductor layer (close-attachment layer) 707, provided for the purpose of relieving the strong electric field that is generated around the conductor 704 and protecting inner layers. In addition, in the execution of connection, for example, it needs to be easily detachable from the outer semiconductor layer (close-attachment layer) 707, and other layers may also be interposed. Examples of materials used for the outer semiconductor layer (detachment layer) 708 include crosslinkable or non-crosslinkable resin compositions containing at least one of rubber materials such as soft polyolefins, ethylene-propylene rubber, and butyl rubber, styrene-butadiene thermoplastic elastomers, polyester elastomers, and the like and having blended therewith 30 to 100 parts by mass of electrically conductive carbon black per 100 parts by mass of the base material. However, as long as the required performance is satisfied, materials are not particularly limited. In addition, as necessary, additives such as graphite, lubricants, metals, and fillers such as inorganic fillers may be contained, for example. In addition, the method for forming the outer semiconductor layer (detachment layer) 708 on the surface of the outer semiconductor layer (close-attachment layer) 707 is not particularly limited, but extrusion molding is preferable.

As above, because of the characteristic transesterification reaction of the resin composition of this embodiment, use thereof makes it possible to extend the product life.

The resin cured product of this embodiment is applicable to various mobiles. Mobiles include, but are not particularly limited to, cars, railway vehicles, electric two-wheeled vehicles, and bicycles. In the case of a car, the resin complex of this embodiment can be used as a car interior body structure. The kind of resin complex is not particularly limited and may be a fiber-reinforced plastic, for example. In a car body, resins are used in various regions, and the resin composition of this embodiment is applicable to all the regions.

The resin cured product of this embodiment is applicable to various structures including building structures.

Example 1

Figure 8:
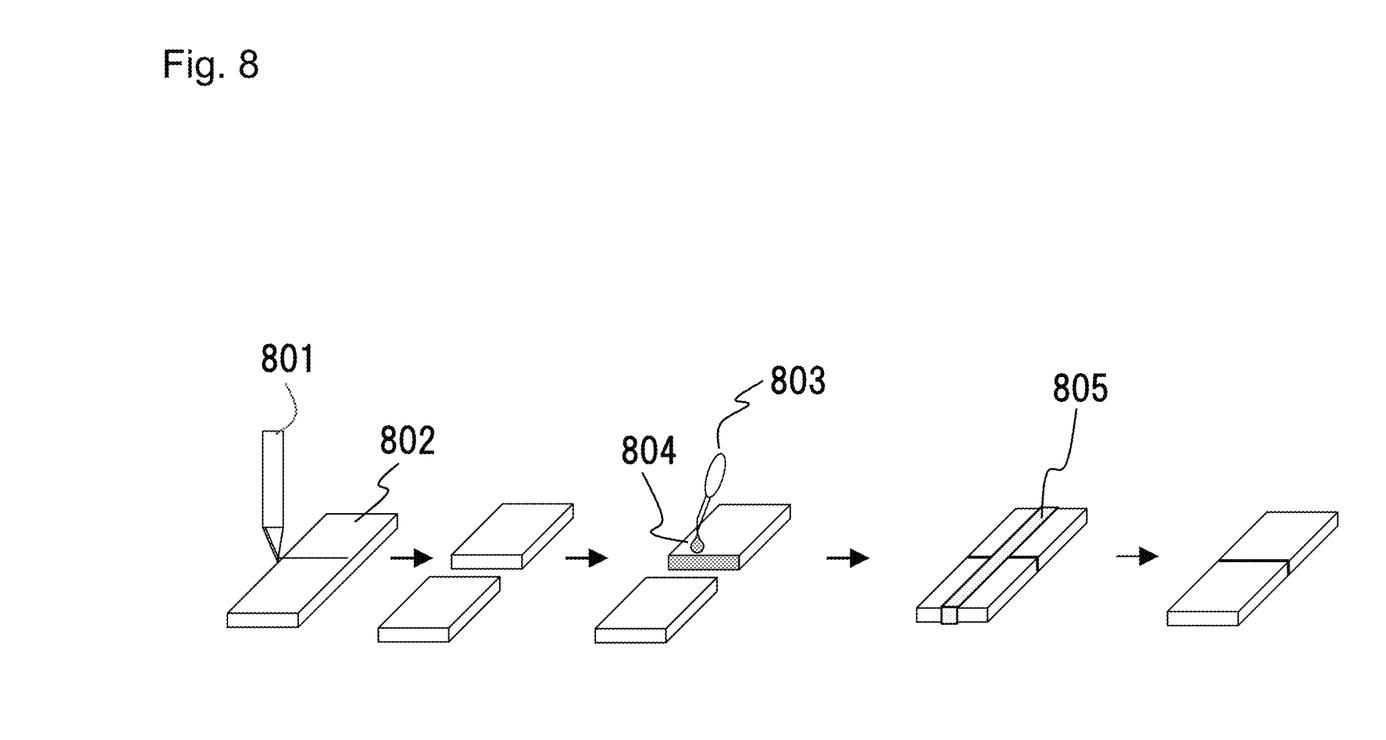
FIG. 8 is a diagram showing a method for producing a sample for the evaluation of self-healing properties.

The method for producing a liquid varnish of this embodiment and the curing of a thermosetting resin will be described through this example.
<Liquid Varnish>
30 g (290 mmol) of styrene (manufactured by Tokyo Kasei Kogyo Co., Ltd.), 30 g (59 mmol) of bisphenol-A glycerolate dimethacrylate (manufactured by sigma Aldrich), 7.7 g (59 mmol) of 2-hydroxymethacrylate, 1.8 g of diethylmethoxyborane (manufactured by sigma Aldrich) (3 wt % of the total weight of styrene and bisphenol A glycerolate dimethacrylate), and 3.2 g of zinc naphthenate (manufactured by Tokyo Chemical Industry Co., Ltd.) were placed in a screw bottle made of glass. Using a mix rotor, the reagents in the screw bottle were stirred to give a uniform liquid varnish.
<Resin Curing Conditions>
The produced varnish was poured into a petri dish made of aluminum (40 mm in diameter, 10 mm in height) having applied thereto a silicone release agent, and cured in a thermostat at 120° C. for 4 hours.
<Self-Healing Property Evaluation Method>
(Healing Method 1)
The resin cured product was fractured and healed by the following method, and the healing function was evaluated. Hereinafter, FIG. 8 will be referred to. The cured resin cured product was scratched with a utility knife 801, and then the resin cured product 802 was held at both ends and broken. Subsequently, using a syringe 803, a healing material 804 consisted of the same vinyl monomer as the resin cured product 802 was applied to the fracture surfaces of the resin cured product, and the fracture surfaces were closely attached to each other and then fixed with a polyimide tape 805, followed by curing in a thermostat at 120° C. for 30 minutes. The healing material 804 does not contain a radical polymerization initiation catalyst. From the resin cured product after curing, a sample was cut out to a size of about 10 mm×3 to 5 mm×30 mm using a low-speed cutter, and subjected to a tensile strength test.

As the tensile strength tester, AGS-100G manufactured by Shimadzu Corporation was used. The temperature was room temperature, the tensile rate was 1 mm/min, the span distance was 10 mm, and the arm-holding margin was 10 to 30 mm. The number of measurements was n=5, and their average was used as the measured value. The evaluation results are shown in Table 2.

Figure 9:
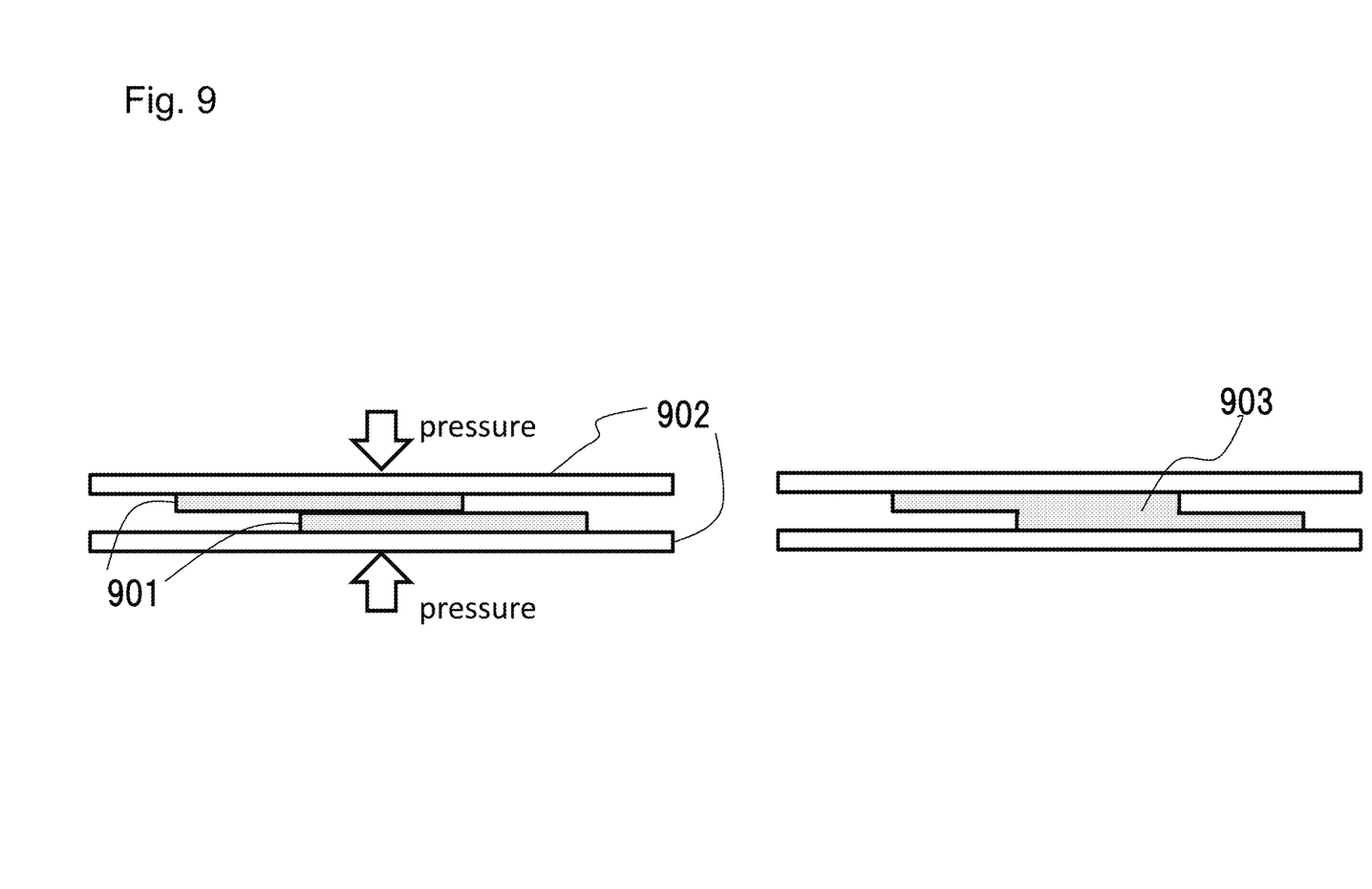
FIG. 9 is a diagram showing a method for producing a sample for the evaluation of self-healing properties.

(Healing Method 2)
The resin cured product was fractured and healed by the following method, and the healing function was evaluated. Hereinafter, FIG. 9 will be referred to. The cured resin cured product was cut out to 20 mm×5 mm×0.5 mm. As shown in FIG. 9, two test pieces 60 were stacked and sandwiched between glass slides 61, then fixed with a clip from above, and heated in a thermostat at 120° C. for 5 hours, and the occurrence of adhesion was checked to perform an adhesion test. Using a dynamic viscoelasticity apparatus EPLEXOR 4000N manufactured by GABO, in a tensile mode, a shear tensile test was performed at room temperature. The number of measurements was N=4, and their average was used as the adhesion strength. The evaluation results are shown in Table 2.

"Healing rate" is defined as the strength after healing relative to the initial strength as 100%.
<Refractory Life Evaluation Method>
The produced varnish was poured into a die capable of producing a 100 mm×100 mm×4 mm resin plate and cured in a thermostat at 120° C. for 4 hours, thereby producing a resin plate. In accordance with JISK7171, the produced resin plate was cut out to 80 mm×10 mm×4 mm to produce a bending test piece. This bending test piece was allowed to stand in a thermostat at 180° C. for 600 hours to cause thermal degradation, and then subjected to a bending test, and the strength was compared with the strength before thermal degradation. As the bending strength tester, AGS-100G manufactured by Shimadzu Corporation was used, and the test was performed under test conditions in accordance with JISK7171. The evaluation results are shown in Table 3.

Example 2

A resin cured product was produced in the same manner as above, and the healing method and the refractory life were each evaluated. The composition is shown in Table 1. Incidentally, the used reagents are methyl methacrylate (manufactured by Tokyo Chemical Industry Co., Ltd.), ethylene glycol dicyclopentenyl ether methacrylate (manufactured by Sigma-Aldrich), 2-hydroxymethacrylate (manufactured by Tokyo Chemical Industry Co., Ltd.), and CT50 (manufactured by Hitachi Chemical Co., Ltd.). The evaluation results are shown in Tables 2 and 3.

Example 3

A resin cured product was produced in the same manner as above, and the healing method and the refractory life were each evaluated. The composition is shown in Table 1. Incidentally, the used reagents are methyl methacrylate (manufactured by Tokyo Chemical Industry Co., Ltd.), ethylene glycol dicyclopentenyl ether methacrylate (manufactured by Sigma-Aldrich), 2-hydroxymethacrylate (manufactured by Tokyo Chemical Industry Co., Ltd.), and CT50 (manufactured by Hitachi Chemical Co., Ltd.). The evaluation results are shown in Tables 2 and 3.

Comparative Examples 1, 2, and 3

Resin cured products were produced in the same manner as in Examples 1 to 3, and the healing method and the refractory life were each evaluated. Each composition is shown in Table 1. Comparative Example 1 relates to a conventional resin cured product having self-healing properties, which contains a boron compound and has living radical polymerizability. Comparative Example 2 relates to a resin cured product having only self-healing properties caused by a transesterification reaction. Comparative Example 3 relates to a resin cured product that exhibits no self-healing properties. The evaluation results of each product are shown in Tables 2 and 3.

<Self-Healing Property Evaluation Results>

Hereinafter, the results will be described with reference to Table 2.

With respect to the healing method 1, in Examples 1 to 3, the results all showed a healing rate of 95% or more. After the tensile strength test, the fracture conditions of the test pieces were observed. As a result, the fractures were all not interfacial failures but cohesive failures. In addition, in many of the test pieces, the fracture occurred in a region other than the healing region. These results show that the adhesion strength at the healing interface is extremely high. In addition, with respect to the healing method 2, in Examples 1 to 3, the healing rate is between 40 and 65%, showing that although the healing rate is lower than in a healing method using living radical polymerizability, healing in a dry process is possible. The difference in healing rate among Examples 1 to 3 is attributable to the difference in the glass transition temperature of the base material resin. It is believed that a resin having a lower glass transition temperature is more prone to bond recombination caused by a transesterification reaction.

In Comparative Example 1, although it was possible to confirm healing properties using living radical polymerizability, healing properties in a dry process were not seen. This result reflects that the varnish composition of Comparative Example 1 does not contain a vinyl monomer having a hydroxyl group and a transesterification reaction catalyst. In addition, in Comparative Example 2, healing properties using living radical polymerizability were not seen, but healing properties in a dry process were seen. This result reflects that the varnish composition of Comparative Example 2 does not contain a boron compound as a living radical polymerization initiation catalyst. In Comparative Example 3, neither the healing function by living radical polymerizability nor the healing function by a transesterification reaction was confirmed.

From above, it can be seen that according to the resin cured product of this embodiment, a liquid healing method by living radical polymerization and a dry-process healing method by a transesterification reaction can be both achieved.

<Refractory Life Evaluation Results>

Hereinafter, the results will be described with reference to Table 3.

In Examples 1 to 3 and Comparative Example 2, as compared with the rate of change in Comparative Example 1, the rate of change in bending strength after thermal degradation was as low as −16 to −12%, showing that the refractory life was extended. This is the effect of the stress relief by bond recombination caused by a transesterification reaction suppressing the formation of resin cracks due to crosslinking at the time of thermal degradation. Comparative Example 1, which is a conventional self-healing resin cured product, does not have such an effect of stress relief, and the refractory life was almost the same as in Comparative Example 3, that is, the same level as conventional resins. From above, it can be seen that according to the resin cured product of this embodiment, because of stress relief by bond recombination caused by a transesterification reaction, the refractory life is extended over conventional self-healing resin cured products.

TABLE 1

| | Vinyl monomer | | | | Radical polymerization initiator | | Transesterification reaction catalyst |
|---|---|---|---|---|---|---|---|
| | Styrene | Bisphenol A glycerol methacrylate | Methyl methacrylate | Ethylene glycol dicyclopentenyl ether methacrylate | 2-Hydroxy-methacrylate | Diethyl-methoxyborane (living radical) | CT50 (free radical) | Zinc naphthenate |
| Example 1 | 30 g 290 mmol | 30 g 59 mmol | — | — | 7.7 g 59 mmol | 1.8 g 18 mmol | — | 3.2 g |
| Example 2 | — | 30 g 59 mmol | 30 g 290 mmol1 | — | 7.7 g 59 mmol | 1.8 g 18 mmol | — | 3.2 g |
| Example 3 | — | 30 g 59 mmol | — | 30 g 290 mmo1 | 7.7 g 59 mmol | 1.8 g 18 mmol | — | 3.2 g |
| Comparative Example 1 | 30 g 290 mmol | 30 g 59 mmol | — | — | — | 1.8 g 18 mmol | — | — |
| Comparative Example 2 | 30 g 290 mmol | 30 g 59 mmol | — | — | 7.7 g 59 mmol | — | 1.1 g | — |
| Comparative Example 3 | 30 g 290 mmol | 30 g 59 mmol | — | — | — | — | 0.96 g | — |

TABLE 2

| | Self-healing evaluation | | | | | |
|---|---|---|---|---|---|---|
| | Tensile strength/MPa Healing method 1 | | | Shear tensile strength/N Healing method 2 | | |
| | Initial | After healing | Healing rate (%) | Initial | After healing | Healing rate (%) |
| Example 1 | 25 | 25 | 100 | 70 | 31.5 | 45 |
| Example 2 | 28 | 27 | 96 | 75 | 30 | 40 |
| Example 3 | 23 | 23 | 100 | 68 | 44.2 | 65 |
| Comparative Example 1 | 25 | 25 | 100 | 70 | 0 | 0 |
| Comparative Example 2 | 25 | 0 | 0 | 70 | 32 | 46 |
| Comparative Example 3 | 25 | 0 | 0 | 70 | 0 | 0 |

TABLE 3

| | Refractory life evaluation | | |
|---|---|---|---|
| | Initial bending strength/MPa | Bending strength after thermal degradation/MPa | Rate of change/% |
| Example 1 | 25 | 21.3 | −15 |
| Example 2 | 28 | 24.6 | −12 |
| Example 3 | 23 | 19.3 | −16 |
| Comparative Example 1 | 25 | 15 | −40 |
| Comparative Example 2 | 25 | 21.5 | −14 |
| Comparative Example 3 | 25 | 15 | −40 |

REFERENCE SIGNS LIST 201 crack
202 fracture surface
203 resin cured product
204 syringe
205 healing material varnish
206 healing material cured film
301 crosslinking by thermal degradation
302 stress load
303 resin crack
304 hydroxyl group
305 ester bond
306 ester bond after bond recombination
401 ester bond
402 hydroxyl group
403 transesterification reaction catalyst
404 resin fracture surface
501 coated wire
502 magnetic core
503 resin complex
504 coil
505 stator coil
506 rotor magnetic core
507 stator magnetic core
508 slot
509 dynamo-electric machine
510 housing
601 resin-molded coil
602 resin cured product
603 exterior material
604 film-shaped insulating member
700 cable
701 cable
702 sheathing layer
703 insulating layer
704 conductor
705 inner semiconductor layer
706 insulating layer
707 outer semiconductor layer (close-attachment layer)
708 outer semiconductor layer (detachment layer)
709 sheathing layer
710 outer skin layer
801 utility knife
802 resin cured product
803 syringe
804 healing material
805 polyimide tape
901 resin specimen before adhesion
902 glass slide
903 resin specimen after adhesion

The invention claimed is:

1. A resin cured product comprising:
a copolymer of a first vinyl monomer and a second vinyl monomer;
a transesterification reaction catalyst; and
a boron compound,
the first vinyl monomer having an ester bond, and
the second vinyl monomer having a hydroxyl group.

2. The resin cured product according to claim 1, wherein the boron compound is an alkylborane.

3. The resin cured product according to claim 1, wherein in the boron compound, a region capable of initiating radical polymerization is present.

4. The resin cured product according to claim 1, having a healing function such that a radically polymerizable unsaturated monomer is radically polymerized with a region capable of initiating radical polymerization, wherein the region exists on a fracture surface when the resin breaks, and wherein the healing function exerts when the unsaturated monomer and the region come into contact.

5. The resin cured product according to claim 1, wherein a transesterification reaction between the hydroxyl group and the ester bond is initiated in response to an external stimulus.

6. An electrical device comprising the resin cured product according to claim 1.

7. A motor comprising the resin cured product according to claim 1.

8. A transformer comprising the resin cured product according to claim 1.

9. A cable sheath comprising the resin cured product according to claim 1.

10. A mobile comprising the resin cured product according to claim 1.

11. A structure comprising the resin cured product according to claim 1.

12. A method for healing a resin cured product,
the resin cured product comprising a transesterification reaction catalyst, and a boron compound, and a copolymer of a first vinyl monomer having an ester bond and a second vinyl monomer having a hydroxyl group,
the method comprising:
a step of closely attaching fracture surfaces of the resin cured product and pouring a varnish having a third vinyl monomer therein; and
a step of causing a radical polymerization reaction between the boron compound of the fracture surfaces of the resin cured product and the third vinyl monomer of the varnish, thereby forming a polymerization product.

13. The method for healing a resin cured product according to claim 12, wherein
the boron compound is an alkylborane.

14. The method for healing a resin cured product according to claim 12, wherein
in the boron compound, a region capable of initiating radical polymerization is present.

15. A method for healing a resin cured product,
the resin cured product comprising a transesterification reaction catalyst, and a boron compound, and a copolymer of a first vinyl monomer having an ester bond and a second vinyl monomer having a hydroxyl group,
the method comprising:
a step of closely attaching fracture surfaces of the resin cured product and applying an external stimulus thereto; and
a step of initiating a transesterification reaction between the hydroxyl group and the ester bond of the resin cured product in response to a second external stimulus, thereby forming a polymerization product,
wherein the resin cured product is a copolymer of the first vinyl monomer and the second vinyl monomer.

* * * * *